(12) United States Patent
Takikawa

(10) Patent No.: US 10,195,649 B2
(45) Date of Patent: Feb. 5, 2019

(54) WASHING SYSTEM OF MACHINE TOOL

(71) Applicant: FANUC CORPORATION, Minamitsuru-gun, Yamanashi (JP)

(72) Inventor: Ryuji Takikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 15/228,435

(22) Filed: Aug. 4, 2016

(65) Prior Publication Data
US 2017/0043442 A1 Feb. 16, 2017

(30) Foreign Application Priority Data

Aug. 11, 2015 (JP) ................................. 2015-159198

(51) Int. Cl.
*B23Q 17/00* (2006.01)
*B08B 3/02* (2006.01)
(Continued)

(52) U.S. Cl.
CPC ............ *B08B 3/024* (2013.01); *B05B 12/122* (2013.01); *B05B 13/0431* (2013.01); *B05B 15/60* (2018.02); *B08B 5/02* (2013.01); *B23Q 11/005* (2013.01); *B23Q 17/249* (2013.01); *B25J 11/0085* (2013.01); *B08B 13/00* (2013.01)

(58) Field of Classification Search
CPC ..... B23Q 11/005; B23Q 17/249; B08B 13/00; B08B 3/024; B08B 5/02; B05B 12/122; B05B 13/0431; B05B 15/60; B25J 11/0085
See application file for complete search history.

(56) References Cited

U.S. PATENT DOCUMENTS 4,561,776 A 12/1985 Pryor
5,678,466 A 10/1997 Wahl
(Continued)

FOREIGN PATENT DOCUMENTS

JP H08150537 A 6/1996
JP H08197383 A 8/1996
(Continued)

OTHER PUBLICATIONS

Machine Translation of JP 2010158726 to Sato, Jul. 2010.*
Notice of Allowance for U.S. Appl. No. 16/108,252, dated Oct. 3, 2018, 13 pages.

*Primary Examiner* — Michael E Barr
*Assistant Examiner* — Benjamin L Osterhout
(74) *Attorney, Agent, or Firm* — RatnerPrestia

(57) ABSTRACT

A washing system that can reliably remove chips attached to the surface of a jig on which a workpiece is placed. The washing system includes a nozzle, a manipulator for moving the nozzle, an imaging part for capturing an image of a region on which a workpiece is placed, a chip detecting part for detecting a chip in the region based on the image captured by the imaging part, a arrangement determining part for determining a position and posture of the nozzle when the fluid is sprayed to the chip, a manipulator controlling part for controlling the manipulator so that the nozzle is located at the determined position and posture, and a fluid supplying part for injecting, through the nozzle, the fluid that has been supplied to the nozzle.

6 Claims, 13 Drawing Sheets

(51) Int. Cl.
*B23Q 11/00* (2006.01)
*B08B 5/02* (2006.01)
*B25J 11/00* (2006.01)
*B23Q 17/24* (2006.01)
*B05B 12/12* (2006.01)
*B05B 13/04* (2006.01)
*B05B 15/60* (2018.01)
*B08B 13/00* (2006.01)

(56) References Cited

U.S. PATENT DOCUMENTS

| | | | | |
|---|---|---|---|---|
| 5,871,391 | A | * | 2/1999 | Pryor ............... F02F 1/24 356/600 |
| 6,161,055 | A | * | 12/2000 | Pryor ............... G05B 19/4065 382/152 |
| 6,210,086 | B1 | * | 4/2001 | Lecornet ........... B23Q 11/0042 408/67 |
| 7,360,271 | B2 | * | 4/2008 | Nordstrom ........... B08B 1/04 15/104.05 |
| 2002/0003415 | A1 | * | 1/2002 | Nakai ............... G05B 19/4065 318/569 |
| 2010/0247262 | A1 | * | 9/2010 | Sakane ............... B23Q 1/52 409/137 |
| 2011/0265835 | A1 | | 11/2011 | Sato |
| 2015/0107624 | A1 | * | 4/2015 | Sumiyoshi ........... B08B 13/00 134/18 |
| 2015/0107818 | A1 | * | 4/2015 | Fujii ............... F28F 27/02 165/281 |
| 2015/0220077 | A1 | * | 8/2015 | Reiser ............... G05B 19/401 700/114 |
| 2016/0184947 | A1 | * | 6/2016 | Itou ............... B23Q 11/0046 15/319 |

FOREIGN PATENT DOCUMENTS

| | | |
|---|---|---|
| JP | H10015506 A | 1/1998 |
| JP | H10-118884 A | 5/1998 |
| JP | 2007015076 A | 1/2007 |
| JP | 2010158726 A | 7/2010 |
| JP | 2013146651 A | 8/2013 |
| JP | 2015024454 A | 2/2015 |

* cited by examiner

WASHING SYSTEM OF MACHINE TOOL

BACKGROUND OF THE INVENTION

1. Field of the Invention

The invention relates to a washing system for a machine tool.

2. Description of the Related Art

A system for removing chips generated during working of a machine tool by injecting fluid to the chips has been known (for example, Japanese Unexamined Patent Publication (Kokai) No. 10-118884).

In this technical field, technologies for reliably removing chips attached to the surface of a jig for disposing a workpiece have been required.

SUMMARY OF THE INVENTION

In an aspect of the invention, a washing system of a machine tool includes a nozzle capable of injecting fluid, a manipulator which moves the nozzle, an imaging part which images a region on which a workpiece to be processed is placed, a chip detecting part which detects a chip present in the region based on an image imaged by the imaging part, and an arrangement determining part which determines a position and posture of the nozzle when the fluid is injected to the chip detected by the chip detecting part.

Further, the washing system includes a manipulator controller which controls the manipulator so as to arrange the nozzle at the position and posture determined by the arrangement determining part, and a fluid supplying part which supplies the fluid to the nozzle so as to inject the fluid through the nozzle when the nozzle is arranged at the position and posture.

The arrangement determining part may determine the position and posture so that the fluid injected from the nozzle can blow away the chip in a predetermined direction. The imaging part may image the region before the workpiece is placed on the region, and image the region after the workpiece is machined by the machine tool and removed from the region.

The chip detecting part may detect the chip present in the region by comparing the image imaged before the workpiece is placed on the region with the image imaged after the workpiece is removed from the region.

A priority zone may be predetermined within the region. The chip detecting part may detect the chip present in the priority zone based on the image. The arrangement determining part may determine the position and posture when the fluid is injected to the chip present in the priority zone.

The imaging part may be moved by the manipulator. The manipulator controller may operate the manipulator so as to arrange the imaging part at a plurality of positions at which the imaging part can image the region. The imaging part may image the region at each of the plurality of positions.

The imaging part may image the region again after the fluid is injected. The chip detecting part may detect the chip remaining in the region after the fluid is injected, based on the image imaged by the imaging part after the fluid is injected.

The manipulator controller may operate the manipulator so as to arrange the nozzle at the position and posture again when the chip detecting part detects the remaining chip. The fluid supplying part may supply the fluid to the nozzle so as to inject the fluid through the nozzle again.

The washing system may further include a warning generating part which generates a warning when the number of injections of fluid from the nozzle exceeds a predetermined number.

BRIEF DESCRIPTION OF THE DRAWINGS

The above or other objects, features and advantages of the invention will be clarified by the detailed description of exemplary embodiments with reference to the accompanying drawings, in which.

DETAILED DESCRIPTION

Figure 1:
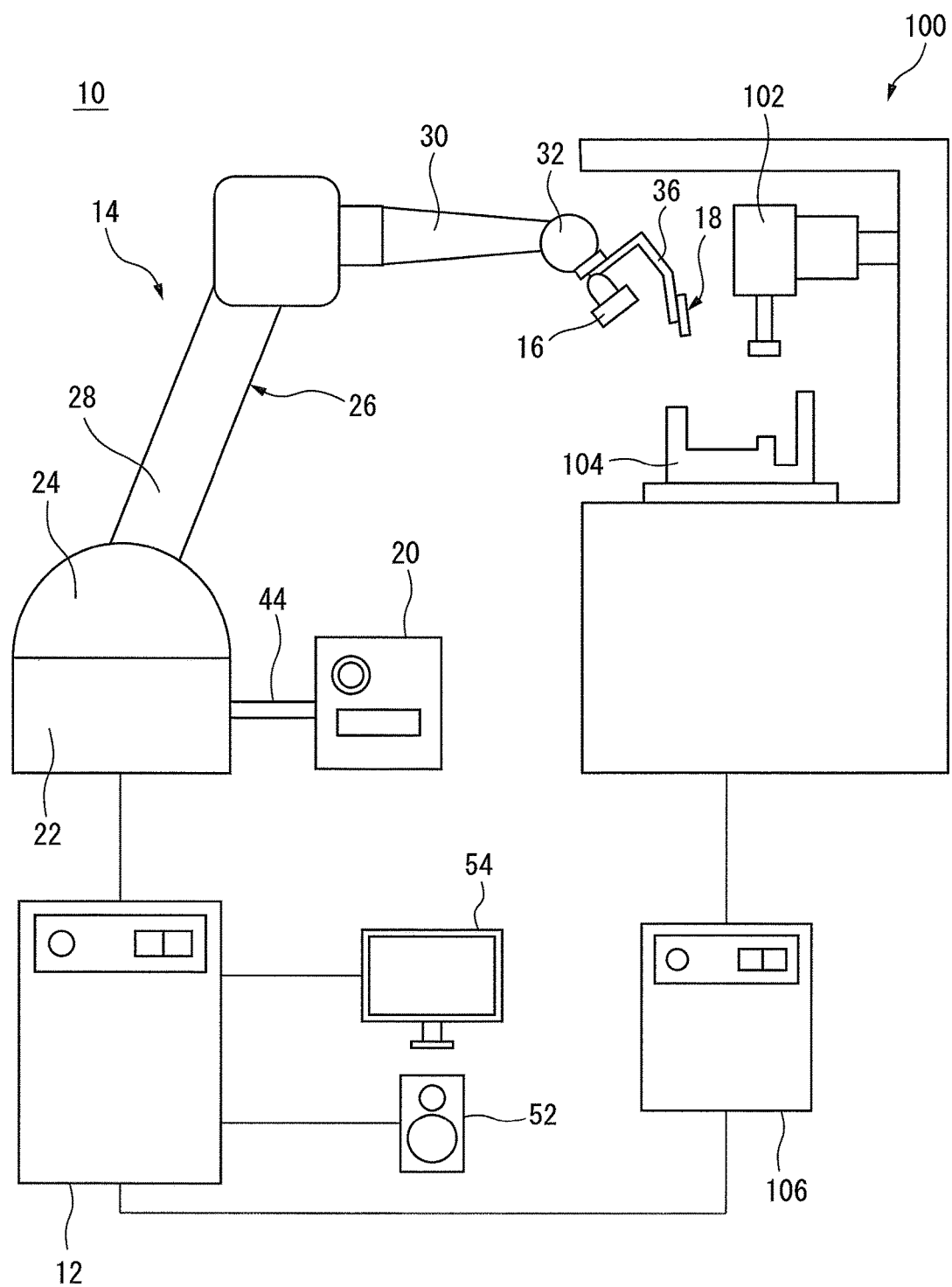
FIG. 1 is schematic view of a washing system according to an embodiment of the invention.

Embodiments of the invention will be described below in detail based on the drawings. First, a washing system 10 according to an embodiment of the invention will be described with reference to FIGS. 1 to 3. The washing system 10 is for washing the inside of a machine tool 100.

The machine tool 100 includes a processing machine 102, a jig 104, and a machine tool controller 106. The processing machine 102 processes a workpiece (not shown) to be processed, which is placed on the jig 104, in accordance with a command from the machine tool controller 106.

The jig 104 is detachably mounted inside of the machine tool 100. Various kinds of jigs other than the jig 104 shown in FIG. 1 may be provided depending on the kind of a workpiece to be processed. The jig 104 is mounted inside of the machine tool 100 before processing on the workpiece, and the workpiece is placed on the jig 104.

Processing the workpiece generates chips. As the machine tool 100 operates, such chips may attach on the surface of the jig 104. The washing system 10 according to this embodiment removes the chips attaching on the jig 104.

The washing system 10 includes a controller 12, a robot 14, an imaging part 16, a nozzle 18, and a fluid supplying part 20. The controller 12 directly or indirectly controls each component of the washing system 10. The controller 12 is connected to the machine tool controller 106 so as to be able to communicate with the machine tool controller 106. The controller 12 carries out a washing operation for the machine tool 100 while communicating with the machine tool controller 106.

The robot 14 is e.g. a vertical articulated robot, and includes a robot base 22, a revolving drum 24, and a robot arm 26. The robot base 22 is fixed on a floor of a work cell. The revolving drum 24 is attached to the robot base 22 so as to revolve about a vertical axis.

The robot arm 26 includes an upper arm 28 rotatably attached to the revolving drum 24, and a forearm 30 rotatably attached to a distal end of the upper arm 28. A wrist 32 is attached to a distal end of the forearm 30. In this embodiment, the robot 14 functions as a manipulator which moves the imaging part 16 and the nozzle 18.

The imaging part 16 is attached to the wrist 32. The imaging part 16 includes an imaging element comprised of e.g. a CCD or CMOS sensor, and an optical system comprised of e.g. a lens. The imaging part 16 photoelectrically converts a subject image entering through the optical system to image data, and outputs the image data.

The imaging part 16 images a region (i.e., the jig 104) on which the workpiece is placed and transmits the image data to the controller 12, in accordance with a commands from the controller 12. The controller 12 receives the image data from the imaging part 16, and stores it in a storage 34 (FIG. 2) built in the controller 12.

Figure 3:
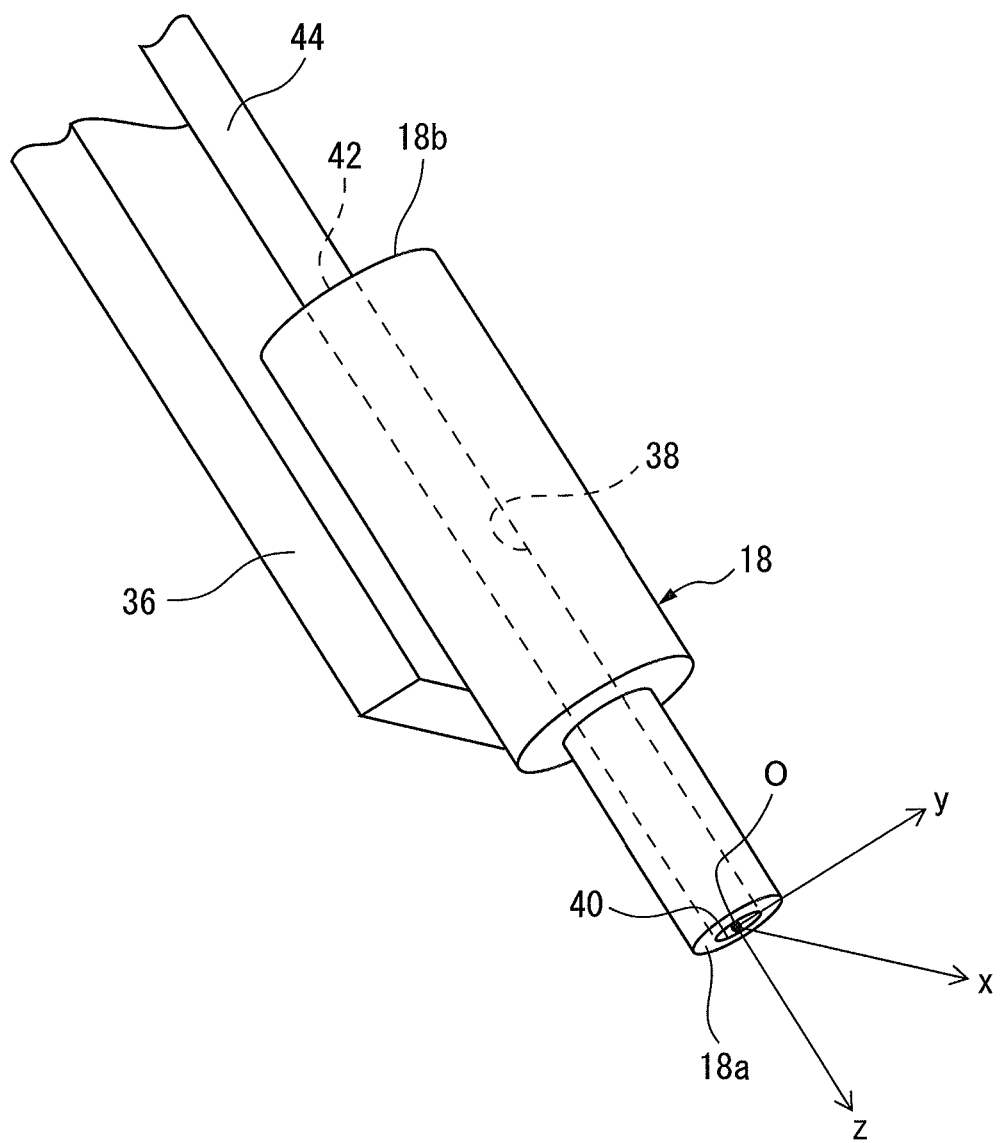
FIG. 3 is an enlarged view of the nozzle shown in FIG. 1.

The nozzle 18 is attached to the wrist 32 via an attachment 36. As shown in FIG. 3, the nozzle 18 is a hollow member extending in the z-axis direction in the orthogonal coordinate system in FIG. 3.

The nozzle 18 has a through-hole 38 extending through the center part of the nozzle 18 in the z-axis direction. The through-hole 38 extends between a first opening 40 formed at an end part 18a of the nozzle 18 in the z-axis positive direction and a second opening 42 formed at an end part 18b of the nozzle 18 in the z-axis negative direction.

The fluid supplying part 20 is fluidly connected to the nozzle 18 via a fluid supplying pipe 44. The fluid supplying pipe 44 is connected to the fluid supplying part 20 at one end thereof, and is connected to the second opening 42 at the other end thereof.

The fluid supplying part 20 supplies fluid (e.g., compressed gas or compressed liquid) into the through-hole 38 of the nozzle 18 via the fluid supplying pipe 44. The fluid supplied from the fluid supplying part 20 into the through-hole 38 of the nozzle 18 is injected from the first opening 40 to the outside.

In this embodiment, the orthogonal coordinate system in FIG. 3 is set as a tool coordinate system for defining a position and posture of the nozzle 18, and is pre-stored in the storage 34. The position and posture of the nozzle 18 in 3D space can be defined by 3D coordinates of origin O, the x-axis direction, y-axis direction, and z-axis direction of the tool coordinate system. Note that, in this embodiment, the origin O is arranged at the center of the first opening 40.

The washing system 10 further includes a speaker 52 and a display 54. The speaker 52 outputs a sound wave in accordance with an audio signal received from the controller 12. The display 54 displays an image in accordance with image data received from the controller 12.

Next, the operation principle of the washing system 10 will be described with reference to FIGS. 1 to 4. The washing system 10 removes chips attaching on the jig 104 after the workpiece placed on the jig 104 is processed by the processing machine 102 and removed from the jig 104.

Figure 4:
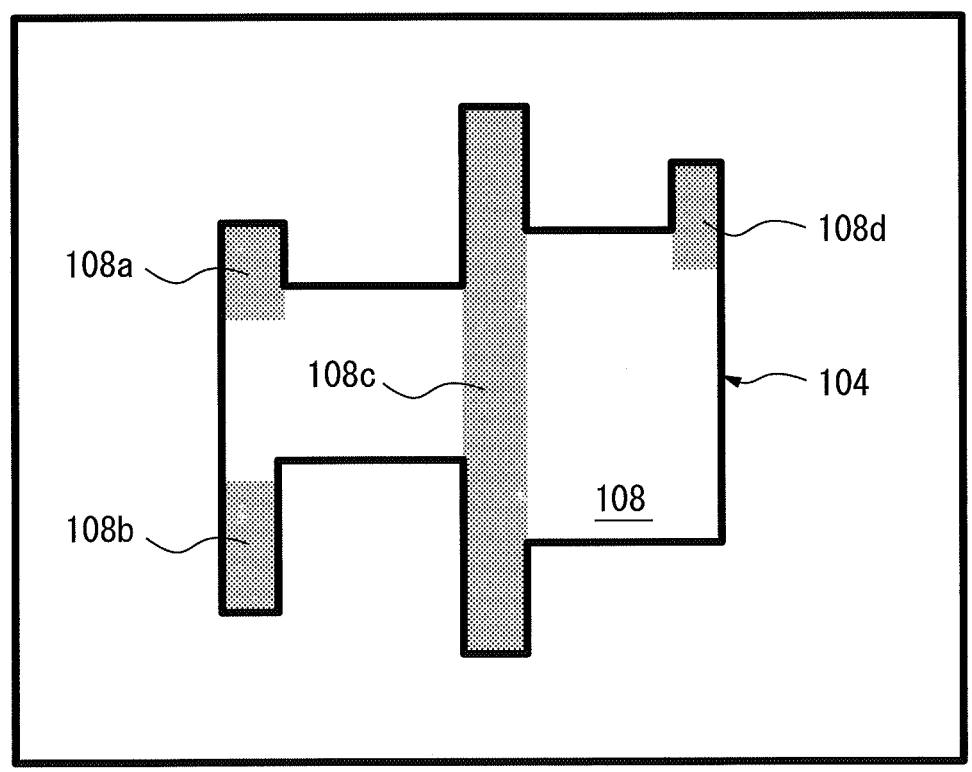
FIG. 4 is a top view of the jig shown in FIG. 1 as seen from the upward in FIG. 1.
Figure 4:

As shown in FIG. 4, the jig 104 according to this embodiment has a relatively complicated structure. In such a jig 104, there can be a zone in which removal of chips is difficult or a zone in which attachment of chips significantly influences the processing accuracy, whereas there can be a zone in which attachment of chips hardly influence the processing accuracy, (i.e., a zone for which washing is not necessary).

In this embodiment, a user predetermines a zone, in which chips should be intensively removed, as a priority zone. For example, in the example shown in FIG. 4, a first zone 108a, a second zone 108b, a third zone 108c, and a fourth zone 108d are set as priority zones within a region 108 on the jig 104.

Such a priority zone can be predetermined by a user for each of various kinds of workpieces. The storage 34 pre-stores the kind of the workpiece and the priority zone set for the workpiece in association with each other.

For example, in the example shown in FIG. 4, the storage 34 pre-stores information of the first zone 108a, the second zone 108b, the third zone 108c, and the fourth zone 108d in association with the kind of the jig 104.

Thus, the controller 12 can recognize the first zone 108a, the second zone 108b, the third zone 108c, and the fourth zone 108d, which are set for the jig 104.

The washing system 10 images the region 108 on the jig 104 before and after the workpiece is processed, and detects chips present in the first zone 108a, the second zone 108b, the third zone 108c, and the fourth zone 108d, on the basis of the image.

When the washing system 10 detects chips in any of the first zone 108a, the second zone 108b, the third zone 108c, and the fourth zone 108d, the washing system 10 injects the fluid to the chips so as to remove them.

Figure 5:
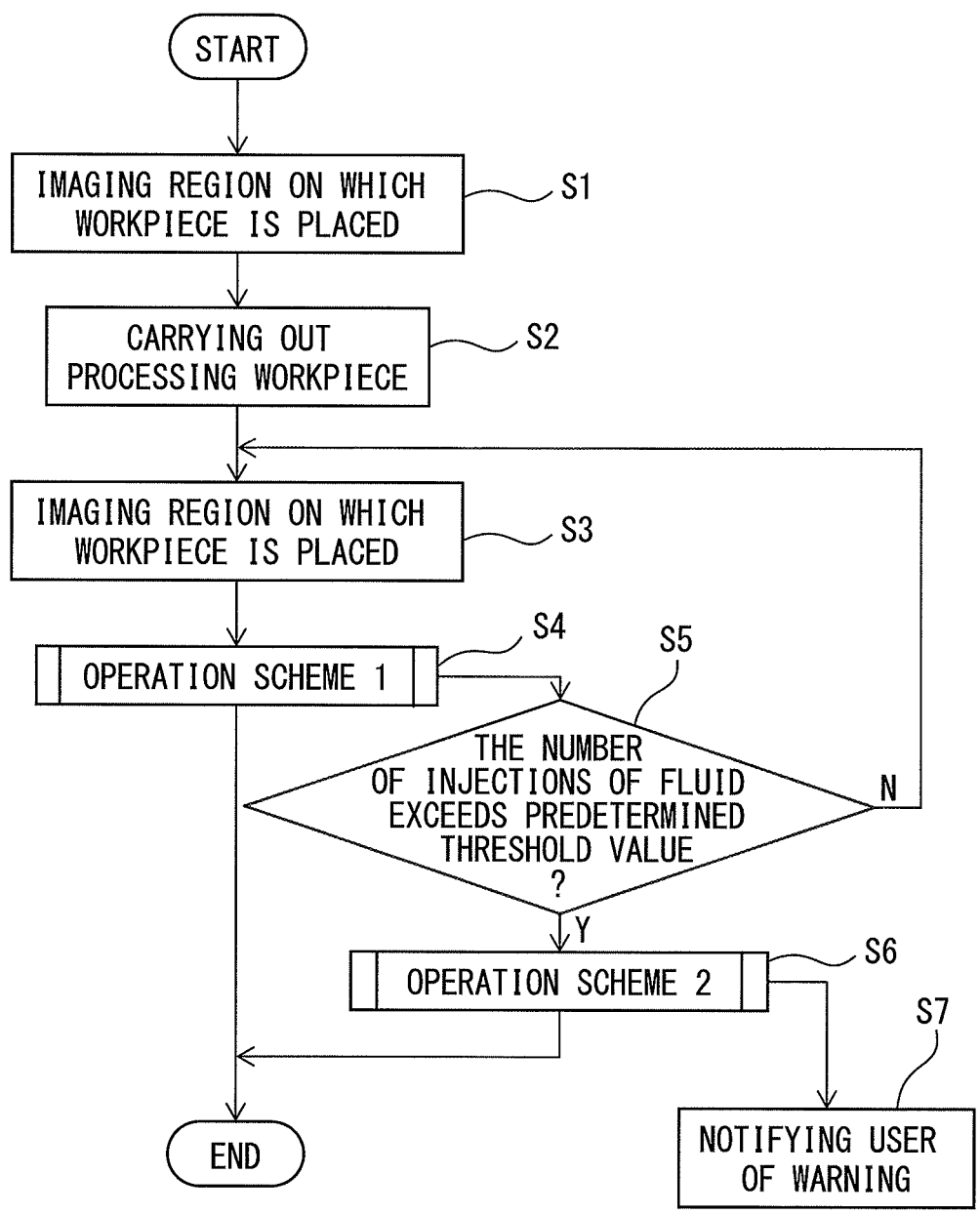
FIG. 5 is a flowchart of an example of an operation flow of the washing system shown in FIG. 1.

Below, the operation flow of the washing system 10 will be described with reference to FIGS. 5 to 11. The flow shown in FIG. 5 is started when the machine tool controller 106 receives a command for processing a workpiece from a user, host controller or a processing program. When the flow shown in FIG. 5 is started, the controller 12 receives information of the kind of a workpiece to be processed from the machine tool controller 106, the host controller or the processing program.

At step S1, the controller 12 images a region on which a workpiece is placed. As an example, the controller 12 moves the robot 14 so as to arrange the imaging part 16 at a predetermined position above the jig 104. The predetermined position is a position at which the imaging part 16 can image the whole of the region 108 on the jig 104, and is predetermined by a user.

As another example, the controller 12 may move the robot 14 so as to successively arrange the imaging part 16 at a plurality of positions predetermined by a user, and operate the imaging part 16 so as to image the region 108 on the jig 104 at each of the plurality of positions.

For example, in the jig 104 shown in FIG. 4, the controller 12 may successively arrange the imaging part 16 at a first position at which the imaging part 16 can image an enlarged image (detailed image) of the first zone 108a, a second position at which the imaging part 16 can image an enlarged image of the second zone 108b, a third position at which the imaging part 16 can image an enlarged image of the third zone, and a fourth position at which the imaging part 16 can image an enlarged image of the fourth zone 108d.

In this case, the storage 34 pre-stores information of the 3D coordinates of the first position, the second position, the third position, and the fourth position, and of the posture (visual line data) of the imaging part 16 at each of these positions, in association with the pre-stored information of the first zone 108*a*, the second zone 108*b*, the third zone 108*c*, and the fourth zone 108*d*.

At step S1, the controller 12 reads out from the storage 34 the 3D coordinates of the first position, the second position, the third position, and the fourth position, and data of the posture (visual line data) of the imaging part 16 at each of these positions. Then, the controller 12 successively arranges the imaging part 16 at the first position, the second position, the third position, and the fourth position, with changing the posture of the imaging part 16 to the one set for each position.

The imaging part 16 respectively images enlarged images of the first zone 108*a*, the second zone 108*b*, the third zone 108*c*, and the fourth zone 108*d*, at the first position, the second position, the third position, and the fourth position, in accordance with a command from the controller 12. The imaging part 16 transmits the obtained image data to the controller 12.

The controller 12 stores the image data received from the imaging part 16 in the storage 34. By this step S1, the controller 12 operates the imaging part 16 so as to image the region 108 on the jig 104 before the workpiece is placed on the region 108.

At step S2, the machine tool controller 106 carries out an operation for processing the workpiece. Specifically, the machine tool controller 106 transmits a command to a workpiece carrying robot (e.g., the robot 14) so as to place the workpiece on the jig 104.

Then, the machine tool controller 106 transmits a command to the processing machine 102 so as to process the workpiece by the processing machine 102. After the completion of processing the workpiece, the machine tool controller 106 transmits a command to the workpiece carrying robot so as to remove the workpiece from the inside of the machine tool 100.

At step S3, the controller 12 images the region on which the workpiece is placed, similar to above-mentioned step S1. Specifically, the controller 12 transmits a command to the robot 14 so as to arrange the imaging part 16 at the positions and postures the same as those at which the imaging part 16 has imaged the workpiece W at step S1, and operates the imaging part 16 so as to image the region 108 on the jig 104. The imaging part 16 transmits the obtained image data to the controller 12.

The controller 12 stores the image data received from the imaging part 16 in the storage 34. By this step S3, the controller 12 operates the imaging part 16 so as to image the region 108 after the workpiece is processed and removed from the region 108.

At step S4, the controller 12 executes an operation scheme 1. Step S4 will be described below with reference to FIG. 6.

After step S4 is started, at step S11, the controller 12 detects whether a chip is present in the n-th zone (n=1, 2, 3, or 4). Note that, as will be described later, the controller 12 repeats a loop of steps S11 to S16 until it determines "YES" at step S16, after the start of step S4.

Below, a case is described where the controller 12 executes the first loop of steps S11 to S16. When the controller 12 executes step S11 in the first loop, the controller 12 sets the zone number "n" to "1" (i.e., n=1), and detects whether a chip is present in the first zone 108*a* at this step S11.

Specifically, the controller 12 reads out from the storage 34 the images which have been imaged by the imaging part 16 at each of steps S1 and S3.

Figure 8:
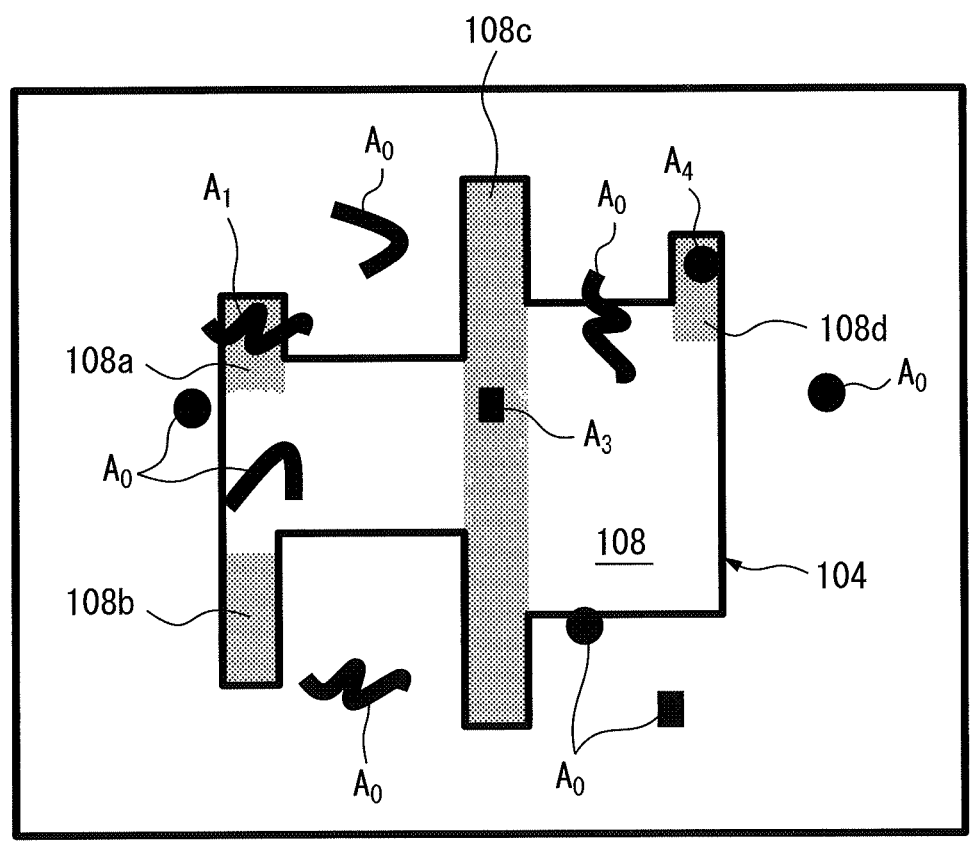
FIG. 8 shows an example of an image imaged at step S3 in FIG. 5.

An example of the image imaged at step S3 is shown in FIG. 8. In this case, chips $A_0$, $A_1$, $A_3$, and $A_4$ have been generated by the process on the workpiece at step S2. More specifically, a chip $A_1$ is present in the first zone 108*a* of the region 108.

Further, a chip $A_3$ is present in the third zone 108*c* of the region 108. Further, a chip $A_4$ is present in the fourth zone 108*d* of the region 108. On the other hand, no chip is present in the second zone 108*b*, and there are a plurality of chips $A_0$ in the zone other than the first zone 108*a*, the second zone 108*b*, the third zone 108*c*, and the fourth zone 108*d*.

The controller 12 compares the image imaged at step S1 (e.g., the image shown in FIG. 4) with the image imaged at step S3 (e.g., the image shown in FIG. 8) so as to calculate the difference in e.g. brightness or color wavelength, and thereby the controller 12 detects the chip $A_1$ present in the first zone 108*a*.

Thus, in this embodiment, the controller 12 functions as a chip detecting part 46 (FIG. 2) which detects a chip present in the region 108 on the jig 104.

When the controller 12 detects the chip $A_1$ at step S11, it determines "YES", and proceeds to step S12. On the other hand, when the controller 12 does not detect the chip $A_1$ at step S11, it determines "NO", and proceeds to step S15.

At step S12, the controller 12 determines a position and posture of the nozzle 18. In this embodiment, a user predetermines the position and posture (i.e., the tool coordinate system) of the nozzle 18 for effectively removing a chip present in each of the first zone 108*a*, the second zone 108*b*, the third zone 108*c*, and the fourth zone 108*d*.

As an example, the tool coordinate system of the nozzle 18 is set so that chips in the region 108 can be blown away radially outward from the center of the jig 104.

Figure 9:
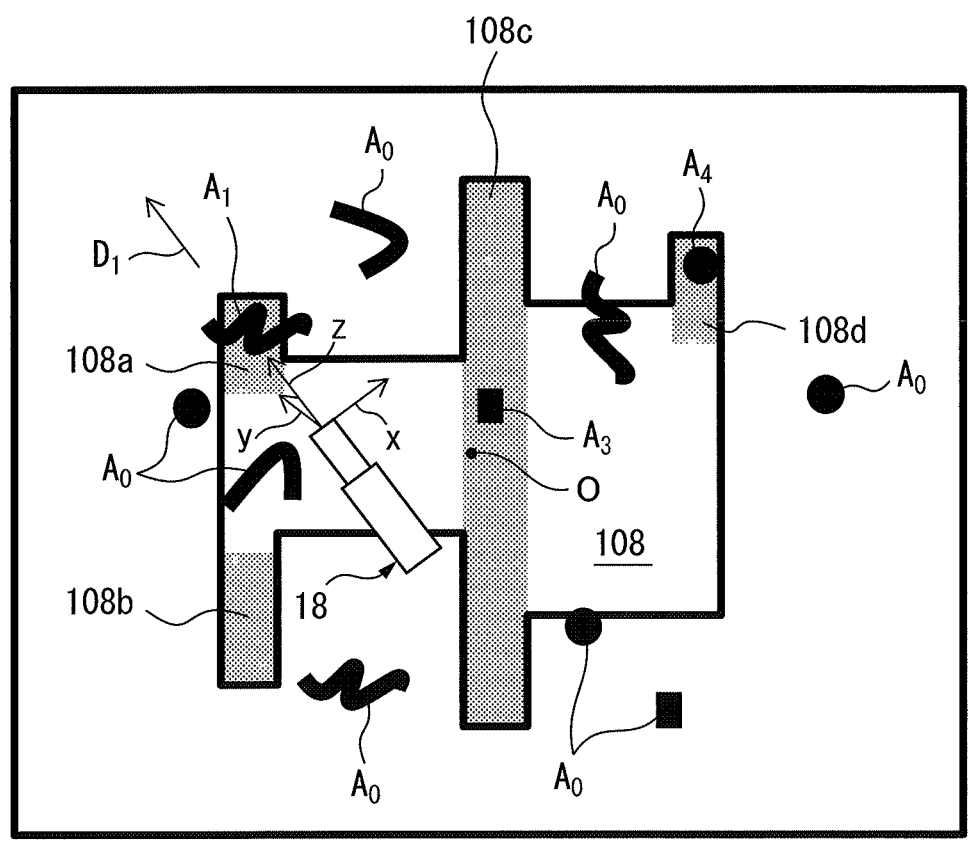
FIG. 9 is a view for explaining step S12, in which an example of the position and posture of the nozzle when injecting the fluid to a chip present in a first zone is illustrated.

For example, as shown in FIG. 9, the tool coordinate system of the nozzle 18 is set as the orthogonal coordinate system in FIG. 9, in order to blow away the chip $A_1$ in the first zone 108*a* by the fluid injected from the nozzle 18.

If the nozzle 18 is arranged at the tool coordinate system shown in FIG. 9, the fluid injected from the nozzle 18 can blow away the chip $A_1$ in a direction $D_1$ (i.e., the z-axis positive direction in FIG. 9) toward radially outward from the center O of the jig 104.

The storage 34 pre-stores the tool coordinate system shown in FIG. 9, which is set for the first zone 108*a*. At this step S12, the controller 12 reads out from the storage 34 the tool coordinate system set for the first zone 108*a*, and determines it as the position and posture at which the nozzle 18 is to be arranged.

Thus, in this embodiment, the controller 12 functions as an arrangement determining part 48 (FIG. 2) which determines the position and posture of the nozzle 18 when injecting the fluid to the chip $A_1$.

At step S13, the controller 12 operates the robot 14 so as to arrange the nozzle 18 at the position and posture determined at step S12. Specifically, the controller 12 operates the robot 14 so as to arrange the nozzle 18 at the tool coordinate system shown in FIG. 9.

Thus, in this embodiment, the controller 12 functions as a manipulator controller 50 which controls the robot 14 (manipulator) so as to arrange the nozzle 18 at the position and posture determined at step S12.

At step S14, the controller 12 injects the fluid from the nozzle 18. Specifically, the controller 12 transmits a command to the fluid supplying part 20 so as to supply the fluid into the through-hole 38 via the second opening 42 of the nozzle 18.

Due to this, the fluid is injected from the first opening 40 of the nozzle 18. The fluid injected from the first opening 40 impinges on the chip $A_1$ in the first zone 108a. As a result, the chip $A_1$ is blown away in the direction $D_1$.

At step S15, the controller 12 increments the zone number "n" by "1". Specifically, when step S15 in the first loop is executed, the zone number "n" is incremented from "1" to "2" at step S15.

At step S16, the controller 12 determines whether the zone number "n" incremented at step S15 is greater than "4" (i.e., n>4). When the controller 12 determines that the zone number "n" is greater than "4" (i.e., determines "YES"), it proceeds to step S17.

On the other hand, when the controller 12 determines that the zone number "n" is not greater than "4" (i.e., determines "NO"), it returns to step S11. In this way, the controller 12 repeats a loop of steps S11 to S16 until it determines "YES" at step S16.

Next, a case is described below where the controller 12 executes the second loop of steps S11 to S16. At step S11 in the second loop, the controller 12 detects whether a chip is present in the second zone 108b (i.e., the zone number n=2).

Specifically, the controller 12 compares the image imaged at step S1 (FIG. 4) with the image imaged at step S3 (FIG. 8) so as to detect the chip in the second zone 108b.

In the example shown in FIG. 8, there is no chip within the second zone 108b. Accordingly, the controller 12 determines "NO" at step S11, and proceeds to step S15. Then, the controller 12 increments the zone number "n" by "1" at step S15. Consequently, the zone number "n" is incremented from "2" to "3".

Then, the controller 12 determines "NO" at step S16 because the zone number "n" (=3) is not greater than 4, and returns to step S11.

Next, a case is described below where the controller 12 executes the third loop of steps S11 to S16. At step S11 in the third loop, the controller 12 detects whether a chip is present in the third zone 108c (i.e., the zone number n=3).

Specifically, the controller 12 compares the image imaged at step S1 (FIG. 4) with the image imaged at step S3 (FIG. 8) so as to detect the chip $A_3$ in the third zone 108c.

In the example shown in FIG. 8, the chip $A_3$ is present within the third zone 108c. Accordingly, the controller 12 detects the chip $A_3$ and determines "YES" at step S11. Then, the controller 12 proceeds to step S12.

At step S12, the controller 12 determines the position and posture of the nozzle 18. For example, as shown in FIG. 10, the tool coordinate system of the nozzle 18 in order to blow away the chip $A_3$ in the third zone 108c is set as the orthogonal coordinate system in FIG. 10.

Figure 10:
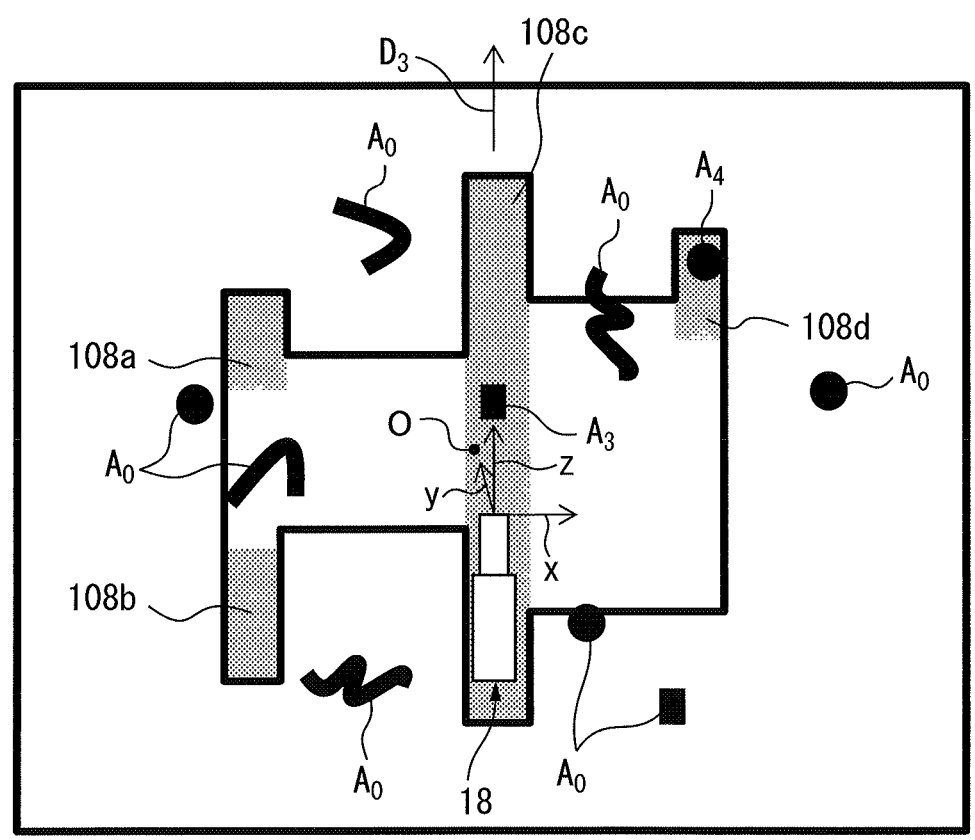
FIG. 10 is a view for explaining step S12, in which an example of the position and posture of the nozzle when injecting the fluid to a chip in a third zone is illustrated.

When the nozzle 18 is arranged at the tool coordinate system shown in FIG. 10, the chip $A_3$ can be blown away in a direction $D_3$ (i.e., the z-axis positive direction in FIG. 10) toward radially outward from the center O of the jig 104 by the fluid injected from the nozzle 18.

At this step S12, the controller 12 reads out from the storage 34 the tool coordinate system set for the third zone 108c, and determines it as the position and posture at which the nozzle 18 is to be arranged.

At step S13, the controller 12 operates the robot 14 so as to arrange the nozzle 18 at the position and posture determined at step S12. Then, at step S14, the controller 12 transmits a command to the fluid supplying part 20 so as to inject the fluid from the first opening 40 of the nozzle 18. The fluid injected from the first opening 40 impinges on the chip $A_3$ in the third zone 108c, as a result of which, the chip $A_3$ is blown away in the direction $D_3$.

At step S15, the controller 12 increments the zone number "n" by "1". Consequently, the zone number "n" is incremented from "3" to "4". Then, the controller 12 determines "NO" at step S16 because the zone number "n"(=4) is not greater than 4, and returns to step S11.

Next, a case is described below where the controller 12 executes the fourth loop of steps S11 to S16. At step S11 in the fourth loop, the controller 12 detects whether a chip is present in the fourth zone 108d (i.e., the zone number n=4).

Specifically, the controller 12 compares the image imaged at step S1 (FIG. 4) with the image imaged at step S3 (FIG. 8) so as to detect the chip $A_4$ in the fourth zone 108d.

In the example shown in FIG. 8, the chip $A_4$ is present within the fourth zone 108d. Accordingly, the controller 12 detects the chip $A_4$ and determines "YES" at step S11. Then, the controller 12 proceeds to step S12.

At step S12, the controller 12 determines the position and posture of the nozzle 18. For example, as shown in FIG. 11, the tool coordinate system of the nozzle 18 in order to blow away the chip $A_4$ in the fourth zone 108d is set as the orthogonal coordinate system in FIG. 11.

Figure 11:
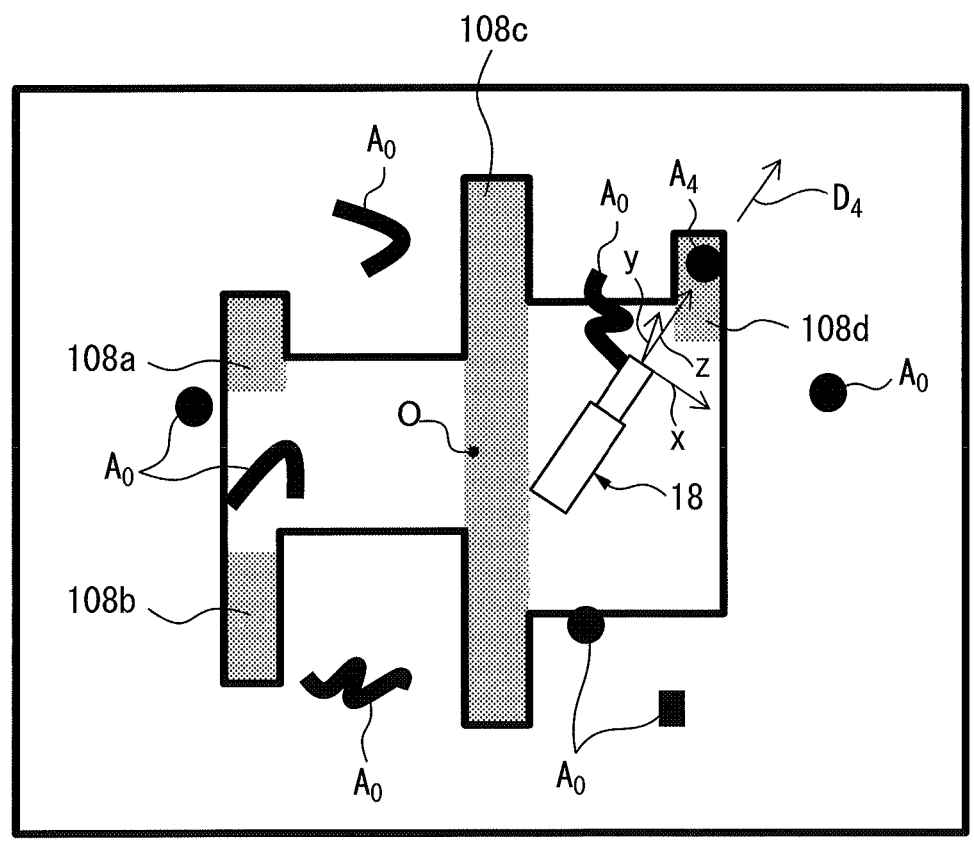
FIG. 11 is a view for explaining step S12, in which an example of the position and posture of the nozzle when injecting the fluid to a chip in a fourth zone is illustrated.

When the nozzle 18 is arranged at the tool coordinate system shown in FIG. 11, the chip $A_4$ can be blown away in a direction $D_4$ (i.e., the z-axis positive direction in FIG. 11) toward radially outward from the center O of the jig 104 by the fluid injected from the nozzle 18.

At this step S12, the controller 12 reads out from the storage 34 the tool coordinate system set for the fourth zone 108d, and determines it as the position and posture at which the nozzle 18 is to be arranged.

At step S13, the controller 12 operates the robot 14 so as to arrange the nozzle 18 at the position and posture determined at step S12. Then, at step S14, the controller 12 transmits a command to the fluid supplying part 20 so as to inject the fluid from the first opening 40 of the nozzle 18. The fluid injected from the first opening 40 impinges on the chip $A_4$ within the fourth zone 108d, as a result of which, the chip $A_4$ is blown away in the direction $D_4$.

At step S15, the controller 12 increments the zone number "n" by "1". Consequently, the zone number "n" is incremented from "4" to "5". At step S16, the controller 12 determines "YES" because the zone number "n"(=5) is greater than 4 (i.e., n>4), and proceeds to step S17.

At step S17, the controller 12 determines whether no chip is detected in all zones 108a, 108b, 108c, and 108d. When the controller 12 detects no chip in all of the first zone 108a, the second zone 108b, the third zone 108c, and the fourth zone 108d, it determines "YES" and ends the flow shown in FIG. 5.

On the other hand, when the controller 12 detects a chip in any of the first zone 108a, the second zone 108b, the third zone 108c, and the fourth zone 108d, it determines "NO" and proceeds to step S5.

In the example shown in FIG. 8, the chips $A_1$, $A_3$, and $A_4$ are detected in the first zone 108a, the third zone 108c, and the fourth zone 108d, and therefore the controller 12 determines "NO" at step S17, and proceeds to step S5.

Referring again to FIG. 5, at step S5, the controller 12 determines whether the number of injections of fluid from the nozzle 18 exceeds a predetermined threshold value. As an example, the controller 12 cumulates the number of injections of fluid every time the fluid is injected from the nozzle 18, and determines whether the number of injections of fluid exceeds a predetermined number of times (e.g., 100 times).

As another example, the controller 12 cumulates the number of injections of fluid from the nozzle 18 to the n-th zone (n=1, 2, 3, or 4), and determines whether the number of injections of fluid exceeds a predetermined number of times (e.g., 10 times).

The controller 12 proceeds to step S6 when it determines that the number of injections of fluid from the nozzle 18 exceeds a threshold value (i.e., determines "YES"). On the other hand, the controller 12 returns to step S3 when it determines that the number of injections of fluid from the nozzle 18 does not exceed a threshold value (i.e., determines "NO").

When having determined "NO" at step S5, the controller 12 executes steps S3 and S4 again. Consequently, the controller 12 detects a chip remaining in the zones 108a, 108b, 108c, and 108d just after step S4 (step S11), and removes the detected chips (steps S12 to S14).

Figure 6:
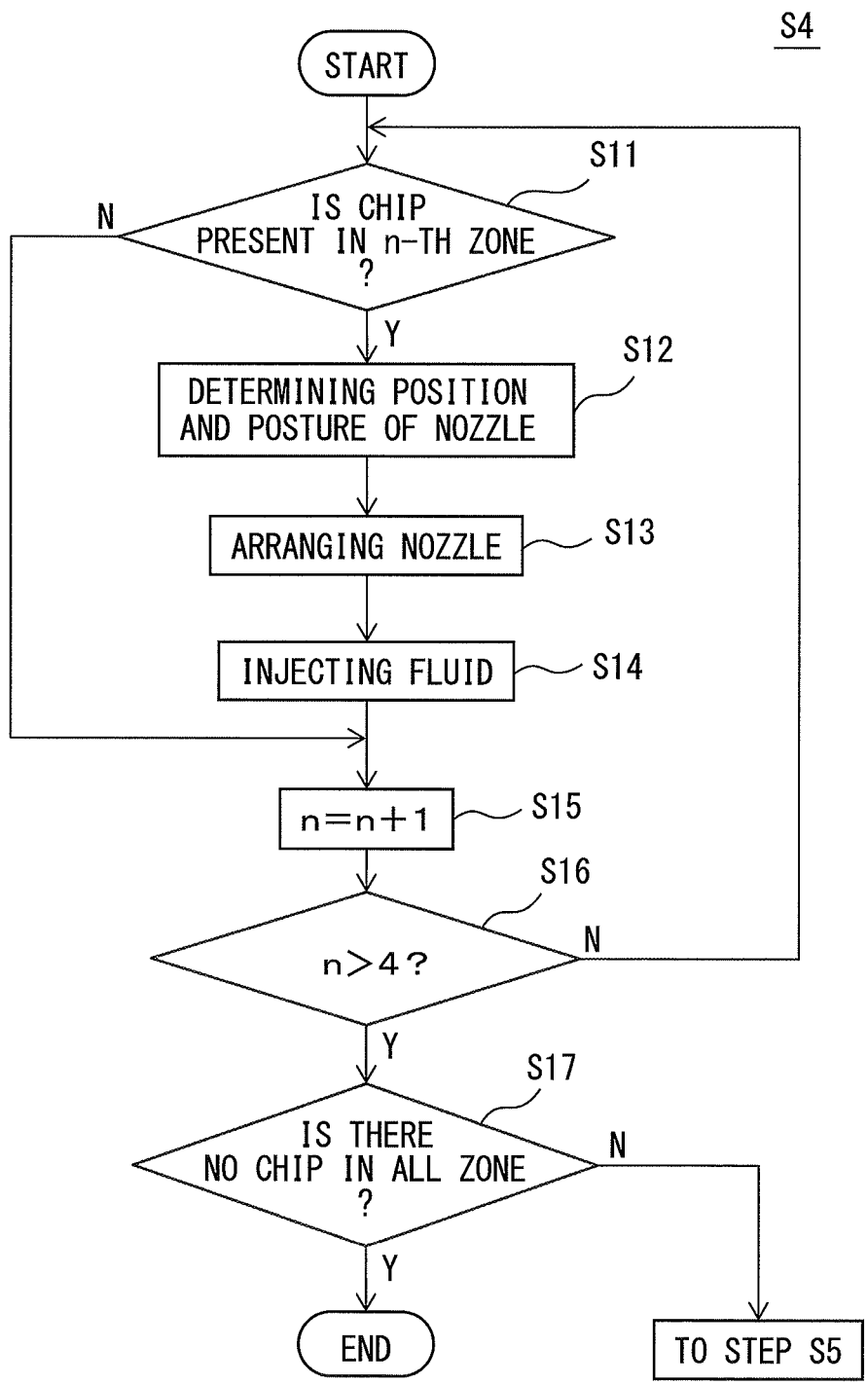
FIG. 6 is a flowchart of an example of a flow of step S4 in FIG. 5.

On the other hand, when having determined "YES" at step S5, the controller 12 executes an operation scheme 2 at step S6. Step S6 will be described with reference to FIG. 7. Note that, processes in FIG. 7 similar to those in FIGS. 5 and 6 are assigned the same reference numerals, and the detailed description thereof will be omitted.

After step S6 is started, the controller 12 executes the above-mentioned step S3. Specifically, the controller 12 transmits a command to the robot 14 so as to arrange the imaging part 16 at the position and posture at which the imaging part 16 has imaged the workpiece W at step S3, and images the region 108 on the jig 104 by the imaging part 16.

Then, the controller 12 executes the above-mentioned step S11. Specifically, the controller 12 detects whether a chip is present in the n-th zone (n=1, 2, 3, or 4). As will be described later, after step S6 is started, the controller 12 repeats a loop of steps S11, S15, and S16 until it determines "YES" at step S16.

For example, if the controller 12 executes step S11 in the third loop, the controller 12 detects whether the chip $A_3$ is present in the third zone 108c.

The controller 12 proceeds to step S7 in FIG. 5 when it determines that a chip is present in the n-th zone (i.e., determines "YES"). On the other hand, the controller 12 proceeds to step S15 in FIG. 7 when it determines that there is no chip in the n-th zone (i.e., determines "NO").

When having determined "NO" at step S11, the controller 12 executes the above-mentioned step S15, and increments the zone number "n" by "1".

Then, the controller 12 executes the above-mentioned step S16. Specifically, the controller 12 determines whether the zone number "n" incremented at step S15 is greater than 4. The controller 12 ends the flow shown in FIG. 5 when it determines that the zone number "n" is greater than 4 (i.e., determines "YES").

On the other hand, the controller 12 returns to step S11 when it determines that the zone number "n" is not greater than 4 (i.e., determines "NO"). In this way, the controller 12 repeats the loop of steps S11, S15, and S16 until it determines "YES" at step S16.

Referring again to FIG. 5, at step S7, the controller 12 notifies a user of a warning. Specifically, the controller 12 generates an audio warning signal and an image warning signal indicating that a chip is detected in the zone 108a, 108b, 108c, or 108d even after the nozzle 18 injects the fluid for the number of times greater than a threshold value.

Then, the controller 12 transmits the audio warning signal and the image warning signal to the speaker 52 and the display 54, respectively. The speaker 52 and the display 54 output sound waves and images in accordance with the warning signals received from the controller 12, thereby notify the user of the warning. Thus, in this embodiment, the controller 12 functions as a warning generating part 56 (FIG. 2) which generates the warning for the user.

As described above, in this embodiment, the controller 12 detects a chip within the region 108 based on the image captured by the imaging part 16, and determines the position and posture (the tool coordinate system) of the nozzle 18 suitable for injecting the fluid to the detected chip.

According to this configuration, a chip present in the region 108 can be reliably and automatically removed. As a result, it is possible to prevent the processing accuracy of the machine tool 100 from reducing due to the chip.

Further, in this embodiment, the controller 12 detects the chips $A_1$, $A_3$, and $A_4$ in each of the zones 108a, 108b, 108c, and 108d which are predetermined by a user, based on the image captured by the imaging part 16.

In addition, the controller 12 determines the position and posture (the tool coordinate system) of the nozzle 18 suitable for removing the present chips $A_1$, $A_3$, and $A_4$, for each of the zones 108a, 108b, 108c, and 108d.

According to this configuration, it is possible to reliably remove the chips $A_1$, $A_3$, and $A_4$ present in the zones 108a, 108b, 108c, and 108d set by a user, even if the jig 104 has a complicated structure.

Further, according to this embodiment, a user can predetermine the zones 108a, 108b, 108c, and 108d within the region 108 on the jig 104 as priority zones for which washing is especially needed.

In addition, the washing system 10 can reliably remove the chips $A_1$, $A_3$, and $A_4$ within the zones 108a, 108b, 108c, and 108d, while washing for a region other than the priority zones can be omitted. According to this configuration, since the number of washing can be reduced, it is possible to reduce the cycle time of processing by the machine tool 100.

Further, in this embodiment, after washing the zones 108a, 108b, 108c, and 108d at step S4, steps S3 and S4 are repeatedly executed unless it is determined "YES" at step S5.

According to this configuration, since steps S3 and S4 are repeatedly executed until no chip is detected within the zones 108a, 108b, 108c, and 108d, it is possible to reliably remove a chip within the zones 108a, 108b, 108c, and 108d.

Further, in this embodiment, since the imaging part 16 and the nozzle 18 are attached to the robot 14, it is possible to arrange the imaging part 16 and the nozzle 18 at the appropriate position and posture just by selecting an operation program of the robot 14 corresponding to each type of jig. Due to this, it is possible to efficiently carry out washing.

Further, in this embodiment, the controller 12 determines whether the number of injections of fluid exceeds the threshold value at step S5. When the controller 12 determines "YES" at step S5 and a chip is detected in any of the zones 108a, 108b, 108c, and 108d at step S6, the controller 12 warns a user at step S7.

According to this configuration, since the number of washing carried out by the washing system 10 can be limited to a predetermined number of times, it is possible to prevent the washing system 10 from endlessly repeat washing due to occurrence of some abnormal event.

Note that, the "some abnormal event" includes an event in which a scratch occurs on any of the zones 108a, 108b, 108c, and 108d and the controller 12 erroneously detects the scratch as a chip at step S11.

Further, the "some abnormal event" includes an event in which a chip or foreign substance, which cannot be removed only by injecting the fluid thereto from the nozzle 18, is attached to any of the zones 108a, 108b, 108c, and 108d.

Note that, in the above-mentioned embodiments, the washing system 10 includes the storage 34, the speaker 52, the display 54, and the warning generating part 56. However, these elements are not indispensable for the invention.

Below, a washing system 60 according to another embodiment of the invention will be described with reference to FIGS. 12 and 13. Note that, in this embodiment, elements similar to those in the above-mentioned embodiments are assigned the same reference numerals, and the detailed description thereof will be omitted.

The washing system 60 includes a controller 62, a robot 14, an imaging part 16, a nozzle 18, and a fluid supplying part 20. The controller 62 directly or indirectly controls each component of the washing system 60. Similar to the above-mentioned embodiments, the imaging part 16 and the nozzle 18 are attached to the robot 14, and moved by the robot 14 in accordance with a command from the controller 62.

Next, the operation of the washing system 60 will be described. The washing system 60 detects chips $A_{10}$ in a region 112 on a jig 110 shown in FIG. 13, for example. The region 112 on the jig 110 is a region on which a workpiece to be processed is placed.

The controller 62 operates the robot 14 so as to arrange the imaging part 16 at a predetermined position and posture, and transmits a command to the imaging part 16 so as to image the region 112 (This corresponds to the above-mentioned step S1).

Then, the controller 62 functions as a chip detecting part 64 so as to detect the chips $A_{10}$ in the region 112 based on the image imaged by the imaging part 16 (This corresponds the above-mentioned step S11).

Then, the controller 62 functions as an arrangement determining part 66 so as to determine the position and posture of the nozzle 18 suitable for injecting the fluid to the detected chips $A_{10}$ (This corresponds to the above-mentioned step S12).

Figure 13:
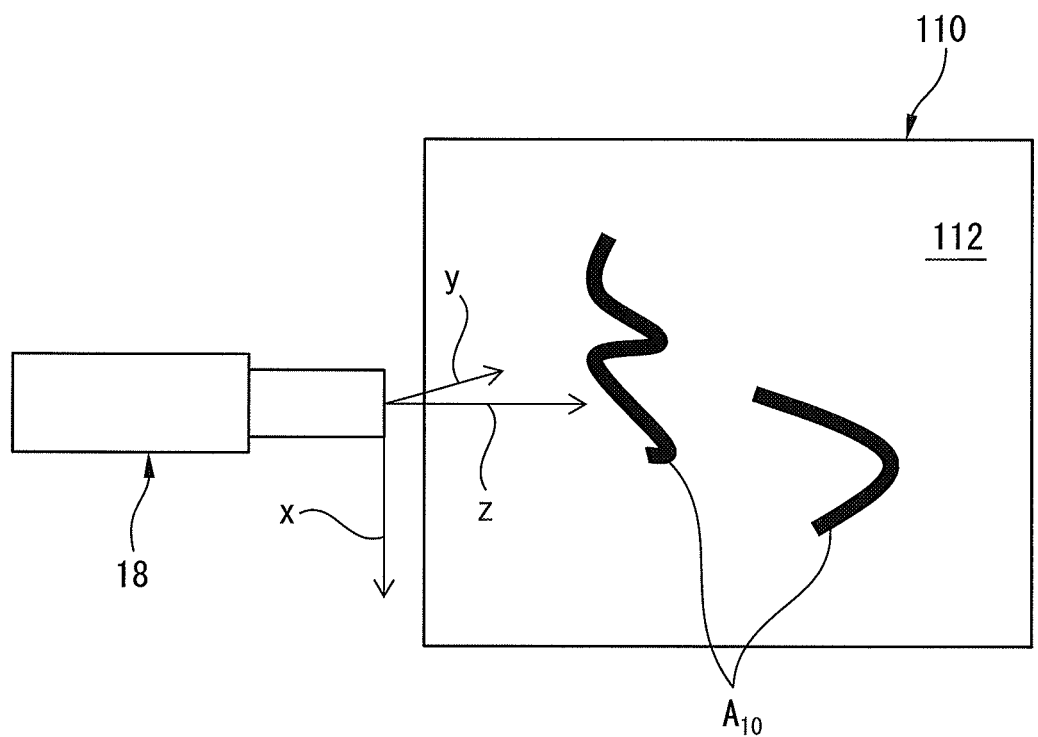
FIG. 13 shows an example of the position and posture of the nozzle when injecting fluid to a chip in the washing system shown in FIG. 12.

For example, the controller 62 sets the tool coordinate system of the nozzle 18 as shown in FIG. 13. The tool coordinate system of the nozzle 18 may be predetermined by a user. Alternatively, the controller 62 may appropriately determine the position and posture of the nozzle 18 suitable for blowing away the chips $A_{10}$, based on the position of the chips $A_{10}$ in the captured image.

Then, the controller 62 functions as a manipulator controller 68 so as to control the robot 14 to arrange the nozzle 18 at the determined position and posture (This corresponds to the above-mentioned step S13). Consequently, the nozzle 18 is arranged as shown in FIG. 13.

Then, the controller 62 transmits a command to the fluid supplying part 20 so as to inject the fluid from the nozzle 18 to the chips $A_{10}$ (This corresponds to the above-mentioned step S14). Consequently, the chips $A_{10}$ in the region 112 can be blown away in a predetermined direction.

Note that, in the above-mentioned embodiments, the controllers 12 and 62 are provided as components for controlling the robot 14 (i.e., as robot controllers) so as to be separate from the machine tool controller 106.

However, the controller 12, 62 may be provided as a component separate from the robot controller for controlling the robot 14. In this case, the controller 12, 62 may be incorporated in the machine tool controller 106.

Figure 2:
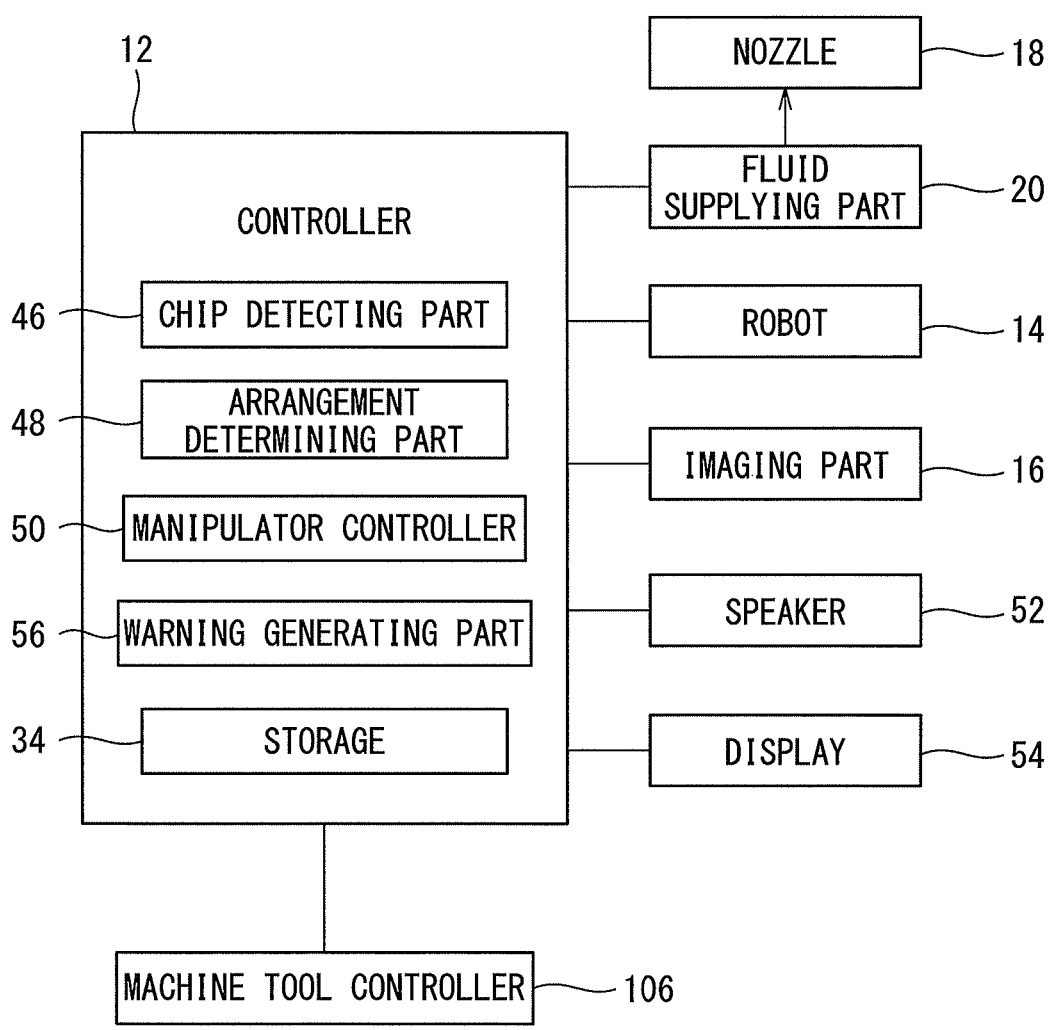
FIG. 2 is a block diagram of the washing system shown in FIG. 1.

Further, in the embodiment shown in FIG. 2, the chip detecting part 46, the arrangement determining part 48, the manipulator controlling part 50, the warning generating part 56, and the storage 34 are incorporated in the controller 12.

However, at least one of the chip detecting part 46, the arrangement determining part 48, the manipulator controlling part 50, the warning generating part 56, and the storage 34 may be provided as a component separate from the controller 12.

Figure 12:
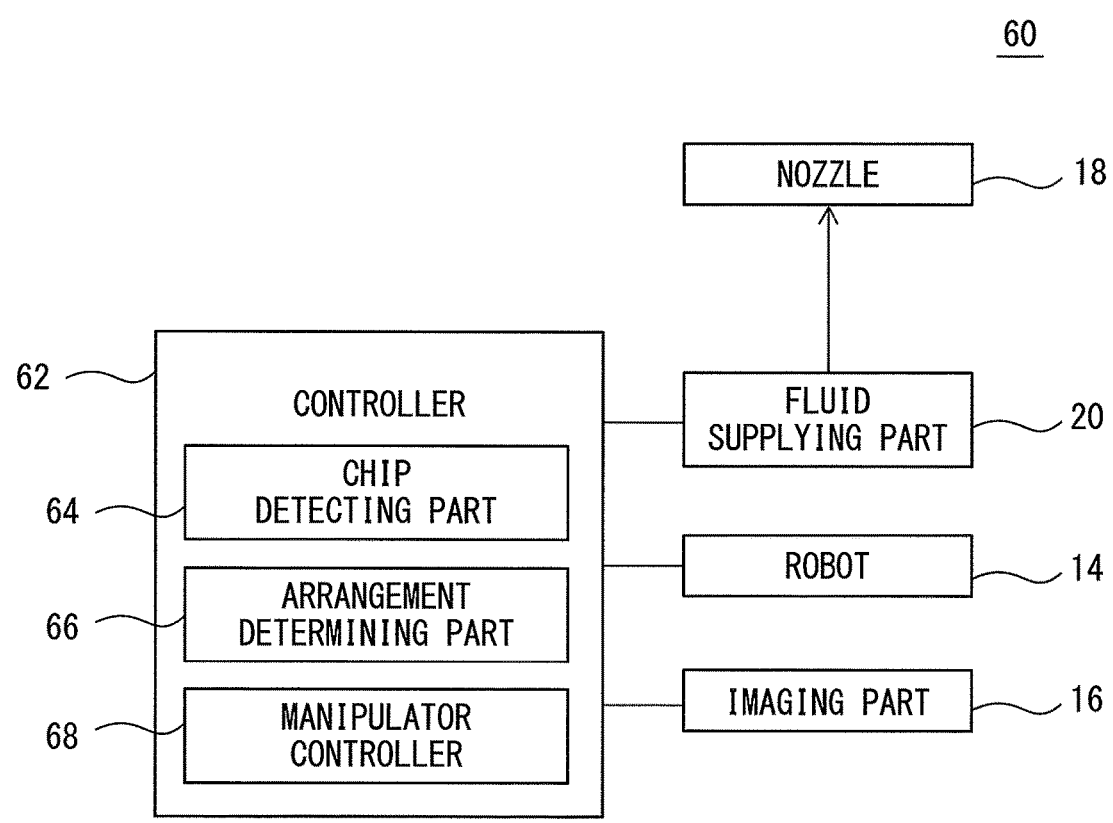
FIG. 12 is a block diagram of a washing system according to another embodiment of the invention.

Similarly, in the embodiment shown in FIG. 12, at least one of the chip detecting part 64, the arrangement determining part 66, and the manipulator controlling part 68 may be provided as a component separate from the controller 12.

Further, in the above-mentioned embodiments, the robot 14 of a vertical articulated type is employed as a manipulator which moves the imaging part 16 and the nozzle 18. However, any manipulator able to move the imaging part 16 and the nozzle 18 may be employed.

Further, the controller 12 may transmit a command to the robot 14 so as to move the nozzle 18 when injecting the fluid from the nozzle 18 at step S14 in FIG. 6. For example, the controller 12 transmits a command to the robot 14 so as to swing the nozzle 18 in order to facilitate to remove a chip by the injected fluid during the execution of step S14.

Further, in the above-mentioned embodiments, the imaging part 16 is attached to the robot 14. However, the imaging part 16 may be fixed to a predetermined fixed point. The fixed point is set at a position at which the imaging part 16 can image the entirety of the jig 104.

Figure 7:
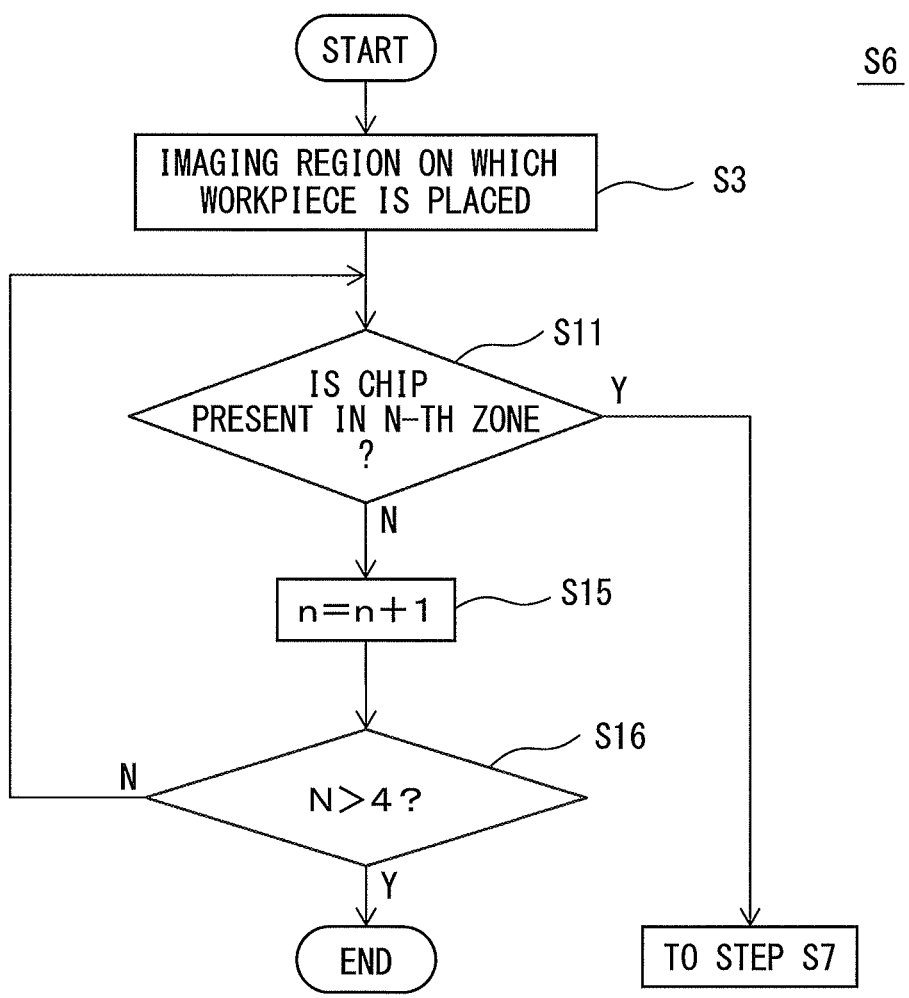
FIG. 7 is a flowchart of an example of a flow of step S6 in FIG. 5.

Further, at step S11 in FIGS. 6 and 7, the controller 12 may detect whether there are chips, the number of which is greater than a predetermined number, in the n-th zone. Specifically, the storage 34 pre-stores the "predetermined number" of chips.

The controller 12 determines "YES" at step S11 when the number of chips detected in the n-th zone is greater than the predetermined number, while the controller 12 determines "NO" when the number of chips detected in the n-th zone is not greater than the predetermined number.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for means for solving the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A washing system of a machine tool, comprising:
   a nozzle capable of injecting fluid;
   a manipulator which moves the nozzle;

an imaging part which images a region on which a workpiece to be processed is placed;

a chip detecting part which detects a chip present in the region based on an image imaged by the imaging part;

an arrangement determining part which determines a position and posture of the nozzle when the fluid is injected to the chip detected by the chip detecting part;

a manipulator controller which controls the manipulator so as to arrange the nozzle at the position and posture determined by the arrangement determining part; and a fluid supplying part which supplies the fluid to the nozzle so as to inject the fluid through the nozzle when the nozzle is arranged at the position and posture, wherein the imaging part images the region before the workpiece is placed on the region for machining the workpiece, and images the region after the workpiece is machined by the machine tool and removed from the region, and wherein the chip detecting part detects the chip present in the region by comparing the image imaged before the workpiece is placed on the region with the image imaged after the workpiece is removed from the region.

2. The washing system according to claim 1, wherein the arrangement determining part determines the position and posture so that the fluid injected from the nozzle can blow away the chip in a predetermined direction.

3. The washing system according to claim 1, wherein a priority zone is predetermined within the region, wherein the chip detecting part detects the chip present in the priority zone based on the image, wherein the arrangement determining part determines the position and posture when the fluid is injected to the chip present in the priority zone.

4. The washing system according to claim 1, wherein the imaging part is moved by the manipulator, wherein the manipulator controller operates the manipulator so as to arrange the imaging part at a plurality of positions at which the imaging part can image the region, wherein the imaging part images the region at each of the plurality of positions.

5. The washing system according to claim 1, wherein the imaging part images the region again after the fluid is injected, wherein the chip detecting part detects the chip remaining in the region after the fluid is injected, based on the image imaged by the imaging part after the fluid is injected, wherein the manipulator controller operates the manipulator so as to arrange the nozzle at the position and posture again when the chip detecting part detects the remaining chip, wherein the fluid supplying part supplies the fluid to the nozzle so as to inject the fluid through the nozzle again.

6. The washing system according to claim 5, further comprising a warning generating part which generates a warning when the number of injections of fluid from the nozzle exceeds a predetermined number.

* * * * *